United States Patent [19]

Kurashige

[11] Patent Number: 5,282,262
[45] Date of Patent: Jan. 25, 1994

[54] METHOD AND APPARATUS FOR TRANSFORMING A TWO-DIMENSIONAL VIDEO SIGNAL ONTO A THREE-DIMENSIONAL SURFACE

[75] Inventor: Masafumi Kurashige, Tokyo, Japan

[73] Assignee: Sony Corporation, Tokyo, Japan

[21] Appl. No.: 865,946

[22] Filed: Apr. 9, 1992

[51] Int. Cl.$^5$ .................... G06K 9/00; G06F 15/62
[52] U.S. Cl. .................... 395/126; 395/127; 358/22; 358/160; 382/41
[58] Field of Search .......... 382/41, 44, 45; 358/22, 358/160; 352/85; 340/729; 395/125, 126, 127; 434/39, 40, 41, 42, 43

[56] References Cited

U.S. PATENT DOCUMENTS

| | | | |
|---|---|---|---|
| 4,511,337 | 4/1985 | Fortunato et al. | 343/43 |
| 4,943,938 | 7/1990 | Aoshima et al. | 340/729 |
| 4,965,844 | 10/1990 | Oka et al. | 382/44 |
| 4,985,756 | 1/1991 | Kawabe et al. | 358/22 |

*Primary Examiner*—Leo H. Boudreau
*Assistant Examiner*—Larry J. Prikockis
*Attorney, Agent, or Firm*—William S. Frommer; Alvin Sinderbrand

[57] ABSTRACT

A method and apparatus for transforming a two-dimensional input video signal onto a three-dimensional surface and for depicting illumination thereof by a spot light source transforms the two-dimensional video signal in accordance with a mapping data signal onto the three-dimensional surface. A spot light source signal including first and second data signals is generated, the first data signal representing the direction of the axis of a spot light source and the second data signal representing a radius of the spot light source. A spot light key signal is generated based on the second data signal and a distance signal representing distances between locations on the three-dimensional surface and the axis of the spot light source based on the first data signal and the mapping data signal. At least one of a luminance component and hue components of at least one of the two-dimensional video image signal and the transformed two-dimensional video image signal is modified in accordance with the spot light key signal.

9 Claims, 6 Drawing Sheets

METHOD AND APPARATUS FOR TRANSFORMING A TWO-DIMENSIONAL VIDEO SIGNAL ONTO A THREE-DIMENSIONAL SURFACE

BACKGROUND OF THE INVENTION

The present invention relates to an image converting apparatus and method for transforming a two-dimensional image input video signal onto a three-dimensional surface, while depicting illumination thereof by a spot light source.

Figure 5A:
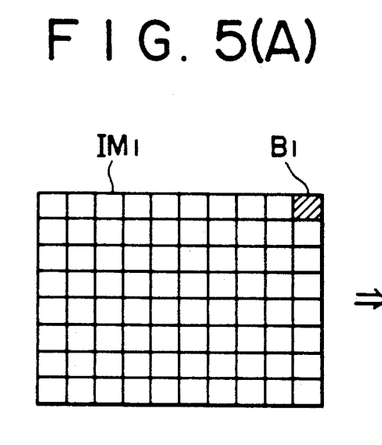
FIGS. 5(A) and 5(B) are schematic views illustrating a conventional technique for transforming a video signal representing a two-dimensional image into a transformed video signal representing an image conforming with a three-dimensional surface.
Figure 5B:
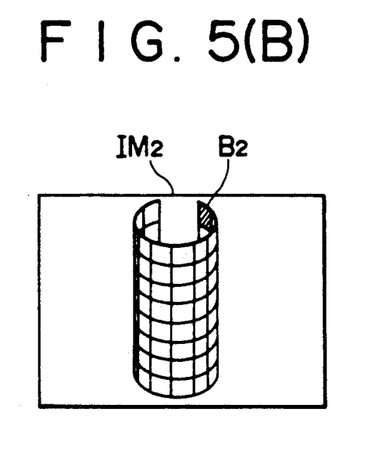

Known image processing apparatus provide the capability of converting video signals representing two-dimensional images into transformed video signals representing cylindrically shaped three-dimensional images. The operation of the prior art apparatus is illustrated with reference to FIGS. 5(A) and 5(B). Referring to FIG. 5(A) an input video signal representing an image $IM_1$ is divided into a plurality of blocks corresponding with respective portions of the two-dimensional image, such as the illustrated block $B_1$. Referring also to FIG. 5(B) the input video signal representing the two-dimensional image depicted in FIG. 5(A) is transformed to depict a three-dimensional, cylindrical image by transforming each of the blocks of the video signal representing corresponding portions of the image $IM_1$ (for example, the block $B_1$) into corresponding portions of the three-dimensional, cylindrical image (for example, the block $B_2$ corresponding with the original block $B_1$).

Figure 6A:
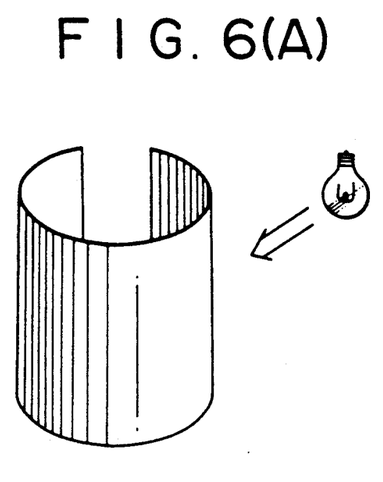
FIG. 6(A) is a schematic illustration of a three-dimensional cylindrical image shaded to depict illumination thereof by a diverging light source.
Figure 6B:
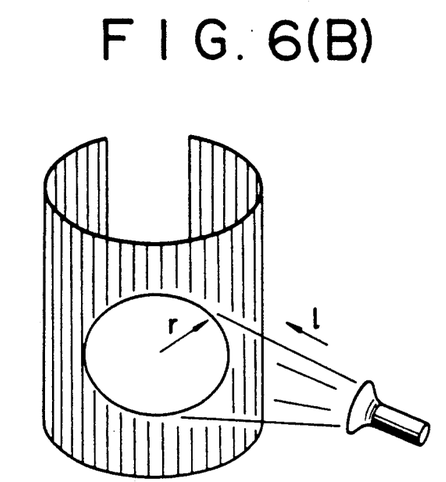
FIG. 6(B) is a schematic illustration of a three-dimensional cylindrical image illuminated by a spot light source in accordance with certain aspects of the present invention.

U.S. Pat. No. 4,965,844, assigned to the assignee of the present application, describes a further image converting apparatus which provides an image of the type illustrated in FIG. 5(B) which is shaded to depict illumination by a diverging beam of light from a desired position, such as the image illustrated in FIG. 6(A).

Figure 7:
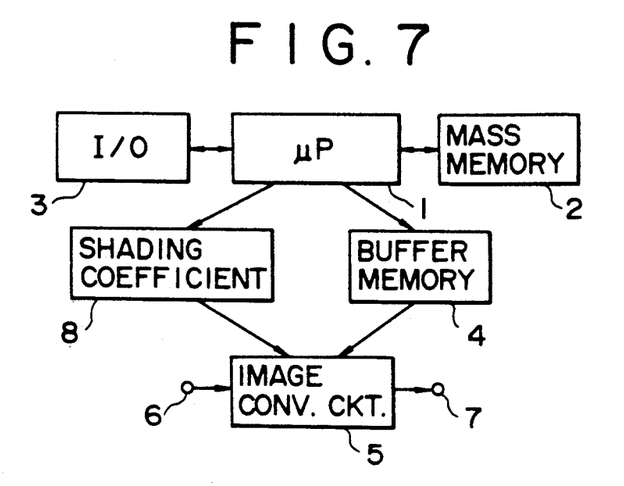
FIG. 7 is a block diagram of a conventional image conversion apparatus.

A block diagram of the known image converting apparatus is provided in FIG. 7. With reference to FIG. 7, a host computer 1, such as a microcomputer, is coupled with a mass memory 2 and an input/output device 3. The mass memory 2 contains programs stored in advance such as a conversion program for converting a video signal representing a two-dimensional image into a transformed video signal representing a three-dimensional cylindrical image, as described above.

When a desired program stored in the mass memory 2 is designated by means of the input/output device 3, the host computer 1 reads the program from the mass memory 2 and, pursuant to such program, generates data necessary for carrying out the image conversion, as described below. The generated data is then stored by the host computer 1 in a buffer memory 4. Pursuant to the image conversion process, a target image is divided into a plurality of blocks and the image transformation process is carried out block by block. In the case of the two-dimensional image as depicted in FIG. 5(A), the original image $IM_1$ thereof comprises 64 by 96 blocks, each block including 8×8 pixels. The converted image $IM_2$, as illustrated in FIG. 5(B), includes 128×128 blocks, each including 4×6 pixels. The selected program determines a post-conversion position of a representative point of each block in the original image $IM_1$ in accordance with X, Y and Z three-dimensional coordinates. The results of such determinations are then stored in the buffer memory 4 of FIG. 7.

It will be seen that the number of blocks in the original image differs from the number of blocks in the transformed image in the above illustrative operation. Consequently the blocks of the converted image do not necessarily correspond on a one-to-one basis with the blocks of the original image. Nevertheless, the resulting converted image depends generally on which block the representative point of each given block (f or example, block $B_1$) of the original image $IM_1$ is placed (for example, block $B_2$ in FIG. 5(B)).

Figure 8A:
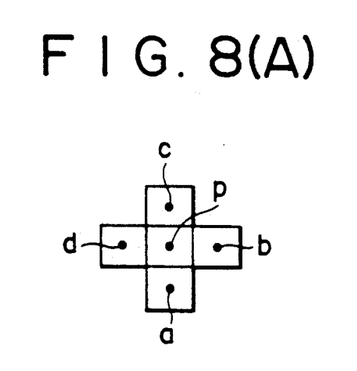
FIGS. 8(A) and 8(B) illustrate a conventional technique for mapping a video signal representing a two-dimensional image onto a three-dimensional surface.

The data for the converted image are obtained in the following manner. With reference to FIG. 8(A), four blocks of the original image have respective representative points a, b, c and d. These four blocks, as illustrated in FIG. 8(A), surround a central block having a representative point P. Once the conversion has been accomplished, the point P is relocated to a position P' as illustrated in FIG. 8(B), while the positions of the representative points a, b, c and d of the surrounding blocks in FIG. 8(A) are relocated to the positions indicated by the points A, B, C and D, respectively, in FIG. 8(B).

Figure 8B:
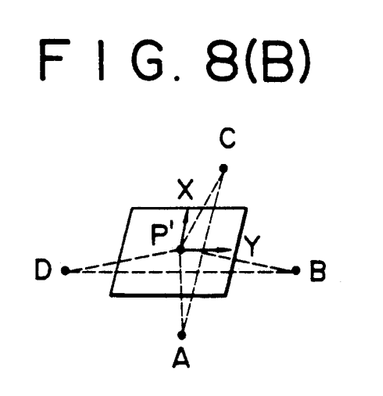

The three-dimensional coordinates of the post-conversion representative points, such as points A, B, C, D and P' as illustrated in FIG. 8(B)), define the type of surface to be formed by the transformation process. A post-conversion surface is then produced by linear approximation in the vicinity of each representative point as follows.

In order to approximate the portion of the surface containing the point P' by such linear approximation, the direction of that surface is defined as parallel to two segment vectors: the segment vector AC connecting the points A and C in FIG. 8(B), and the segment vector DB connecting the points D and B. In FIG. 8(B), the linearly approximated surface containing the representative point P' is defined by two unit vectors: a unit vector PX parallel to the vector AC and a unit vector PY parallel to the vector DB. In this fashion, the surface corresponding with each representative point is linearly approximated, until the entire surface of the converted image is thus obtained.

The magnitude of the vector PX and that of the vector PY are each made proportional to the distances between the representative points A, C and D, B, respectively, of the adjacent blocks as follows:

$$PX = AC/4 \quad (1)$$

$$PY = DB/4 \quad (2)$$

As described above, the buffer memory 4 contains data required for transforming the representative points of the blocks of the original image $IM_1$, and to obtain the post-conversion positions of these representative points, as well as to convert the difference values involved. Such data in the buffer memory 4 is provided to an image converting circuit 5 which also receives the input image data from an input terminal 6. The input image data is converted by the circuit 5 in accordance with the data received thereby from the buffer memory 4 and the converted data is provided at an output terminal 7.

As a preliminary step, the image converting circuit 5 designates a target region of the input image to be converted using the data from the buffer memory 4. That is, the image converting circuit 5 first specifies to what region a given region (for example, region $B_1$) in the original image $IM_1$ as illustrated in FIG. 5(A) will be transformed (for example, the region $B_2$ in the converted image $IM_2$ as illustrated in FIG. 5(B)).

According to this process, read addresses for every pixel in the target region are obtained and placed in an input buffer memory of the image converting circuit 5 of FIG. 7. Then in accordance with each read address thus obtained from the input buffer memory, the corresponding pixel data is obtained and written in an output buffer memory at an address representing the post-conversion position thereof.

The image conversion process is carried out concurrently with a smoothing process whereby jagged edge portions which may appear between the background and the image contour are smoothed out by interpolating sampling points in the image to produce additional sampling points. The additional sampling points produced by interpolation are likewise written in the output buffer memory.

The foregoing describes the basic process for converting a video signal representing a two-dimensional image into a transformed video signal representing a three-dimensional image in accordance with the prior art system. The prior art system also includes a shading coefficient, memory 8 which serves to provide the output image with shading to depict illumination by diverging light from a source located at a particular position relative to the converted image. For this purpose, the memory 8 provides shading coefficients to the image converting circuit 5 for weighting the image data output therefrom to produce a shading effect such as that illustrated in FIG. 6(A). If the image is monochromatic, the brightness level thereof is changed in accordance with the shading coefficient; if the image is a color image, the hue and/or brightness level thereof is varied depending upon the degree of shading represented by the shading coefficients.

Figure 9:
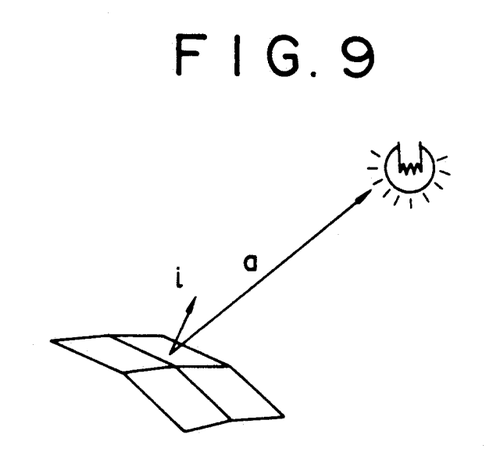
FIG. 9 is a schematic diagram illustrating a conventional technique for shading a three-dimensional image produced by a transformed video signal to depict illumination thereof by a diverging light source.

With reference to FIG. 9, an illustrative method for deriving the shading coefficients is illustrated therein. Each of the rectangular areas depicted in FIG. 9 represents a portion of a three-dimensional image surface approximated by corresponding plane surfaces each containing at least three sampling points. A normal vector i is obtained for each such plane surface and a vector a oriented from each plane surface toward the light source is likewise obtained. The inner product of the vector a and the normal vector i is obtained for each of the plane surfaces and used to find a shading coefficient therefor. The same shading coefficient typically is applied to all pixels contained in a single plane surface. In the alternative, a different shading coefficient may be obtained for application to each pixel on an individual basis.

It will be appreciated that the known image conversion apparatus described above serves to apply a shading effect to an entire three-dimensional image and is, thus, of limited usefulness in creating special three-dimensional video effects.

OBJECTS AND SUMMARY OF THE INVENTION

It is an object of the present invention to provide an apparatus and method for depicting illumination of only a portion of a transformed two-dimensional video image signal by a source such as a spot light or the like.

It is another object of the present invention, in accordance with certain features thereof, to depict illumination of a limited portion of such a transformed two-dimensional video image signal, such as by a spot light or the like, in combination with the depiction of a shading effect representing illumination by a diverging light beam or similar non-directional beam.

In accordance with one aspect of the present invention, an image transforming apparatus for transforming an input video signal representing a two-dimensional image into a transformed video signal representing said two-dimensional image transformed onto a three-dimensional surface and for depicting illumination thereof by a spot light source, said input video signal having a least one of a luminance component and hue components, comprises: means for defining said three-dimensional surface; means for providing a mapping data signal for transforming said input video signal onto said three-dimensional surface; means for transforming said input video signal in accordance with said mapping data signal to generate a transformed video signal representing an image conforming with said three-dimensional surface, said transformed video signal having at least one of a luminance component and hue components; first means for generating a spot light source signal including first and second data signals, the first data signal representing a direction of an axis of a spot light source and the second data signal representing a radius of said spot light source; second means for generating a spot light key signal based on said second data signal and a distance signal representing distances between locations on said three-dimensional surface and the axis of said spot light source based on said first data signal and said mapping data signal; and means for modifying at least one of said luminance component and said hue components of at least one of said input video signal and said transformed video signal in accordance with said spot light key signal.

In accordance with another aspect of the present invention, a method for transforming an input video signal representing a two-dimensional image into a transformed video signal representing said two-dimensional image transformed onto a three-dimensional surface and for depicting illumination thereof by a spot light source, said input video signal having at least one of a luminance component and hue components, comprises the steps of: defining said three-dimensional surface; providing a mapping data signal for transforming said input video signal onto said three-dimensional surface; transforming said input video signal in accordance with said mapping data signal to generate a transformed video signal representing an image conforming with said three-dimensional surface, said transformed video signal having at least one of a luminance component and hue components; generating a spot light source signal including first and second data signals, the first data signal representing a direction of an axis of a spot light source and the second data signal representing a radius of said spot light source; generating a spot light key signal based on said second data signal and a distance signal representing distances between locations on said three-dimensional surface and the axis of said spot light source based on said first data signal and said mapping data signal; and modifying at least one of said luminance component and said hue components of at least one of said input video signal and said transformed video signal in accordance with said spot light key signal.

The above, and other objects, features and advantages of the invention, will be apparent in the following detailed description of an illustrative embodiment thereof which is to be read in connection with the accompanying drawings forming a part hereof, and wherein corresponding parts and components are identified by the same reference numerals in the several views of the drawings.

DETAILED DESCRIPTION OF A PREFERRED EMBODIMENT

Figure 1:
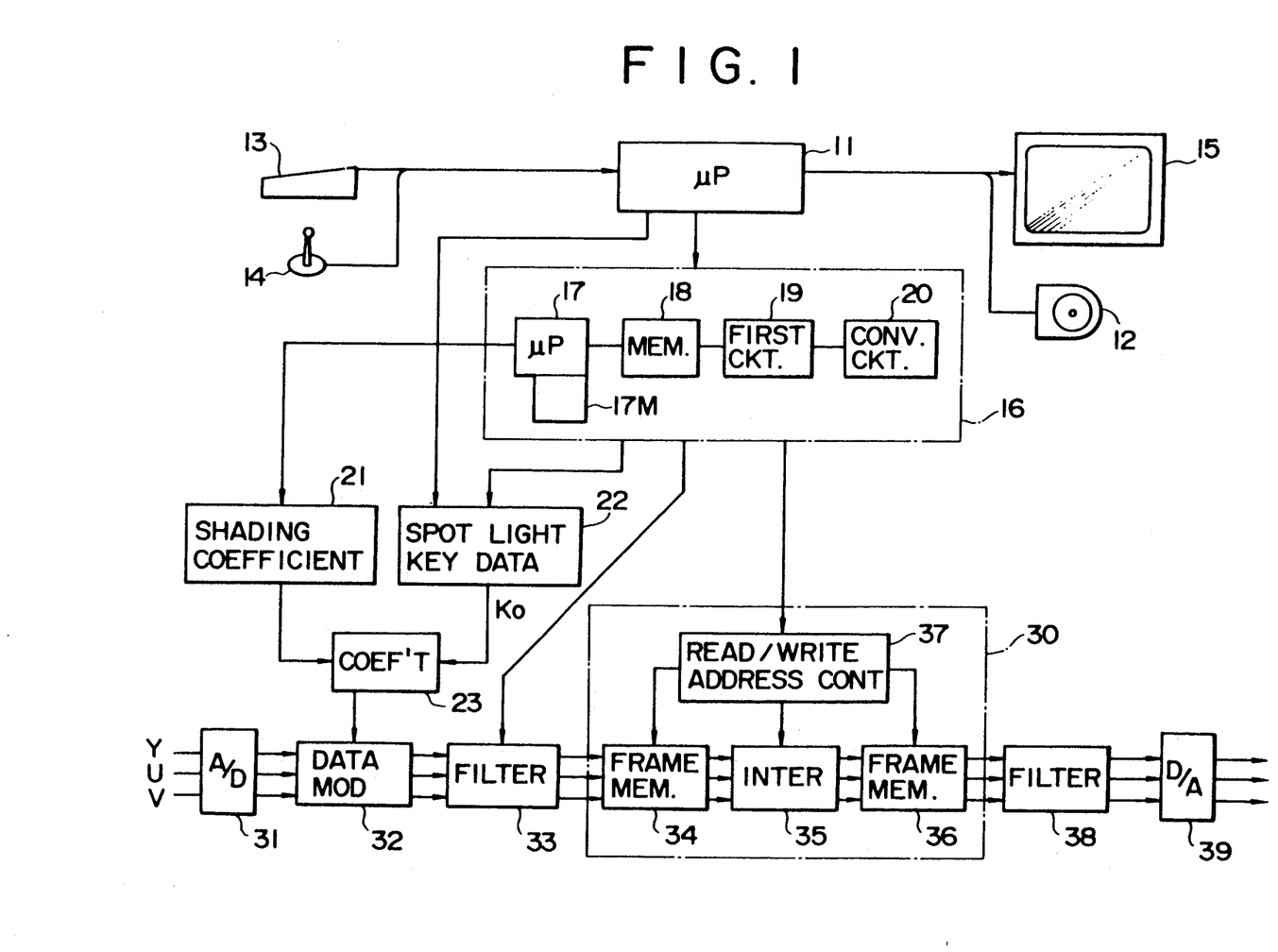
FIG. 1 is a block diagram of an image converting apparatus in accordance with one embodiment of the present invention.

Referring to the drawings, and presently to FIG. 1 thereof, a block diagram of a preferred embodiment of the present invention is provided thereby in which a first microprocessor 11 implemented by a microcomputer or the like, provides a user-machine interface for selecting and initiating a suitable image conversion program based upon input commands. A disk memory 12 coupled with the microprocessor 11 provides mass storage for one or more programs which may be used for transforming a video signal representing a two-dimensional image into a transformed video signal for depicting such two-dimensional image conforming with a three-dimensional surface. The microprocessor 11 is coupled with a keyboard 13 and a joystick 14 to receive user commands therefrom, and with a CRT display 15 serving as a output device.

In operation, a user employs the keyboard 13 to designate a desired type of image conversion, such as the transformation of a signal representing a plane image into a signal representing a three-dimensional, cylindrical image. In response to the input commands, the microprocessor 11 reads a computer program from the disk memory 12 which implements the designated image conversion process and stores the program thus accessed in its main memory. Thereupon, the microprocessor 11 provides an output to the CRT display 15 for indicating that such read and storage operations have taken place.

The user operates the joystick 14 for selecting image position, orientation and other pertinent factors for the conversion process, and corresponding parameters of the accessed program are modified accordingly. The modified program is then transferred to a program memory 17M of a second microprocessor 17 (such as a microcomputer) included in a three-dimensional address generating section 16.

The microprocessor 17 then proceeds to execute the transferred program for determining the post-conversion positions on a block-by-block basis (pursuant to the conventional image transformation process described hereinabove), as well as post-conversion difference values between adjacent blocks based on a linear approximation process, and reciprocal difference values obtained from reciprocal computations, as described below. The data thus obtained are stored in a buffer memory 18 of the three-dimensional address generating section 16.

In the operation of the embodiment of FIG. 1, similarly to the conventional image conversion process, each block of the original image $IM_1$ includes a representative point whose post-conversion position is determined. Image data representing the image region proximate to the converted representative point is then obtained pursuant to the linear approximation process. From this representative data, the addresses of the original image data corresponding with the region of the transformed image proximate to the converted representative point are obtained. In turn, the addresses thus obtained are converted to effect the image conversion.

It will be appreciated that certain conversions will require suppression of image data representing image portions which are obscured in the transformed, three-dimensional image. This process is carried out as follows. A pointer is created which defines an order in which to process blocks one at a time based on positions thereof along a Z axis extending in the direction of image depth. The pointer is written in a table of the buffer memory 18 and, based thereon, the data transformation is carried out block-by-block beginning with the deepest block (furthest from the observation point) and continuing in sequence with blocks which are progressively shallower. This process is also described in Japanese Patent Laid-Open No. 58-219664, as well as in U.S. Pat. No. 4,965,844.

The data thus accumulated in the buffer memory 18 are supplied to a first dedicated hardware circuit 19 which processes the blocks one at a time in accordance with the above-mentioned pointer. For each block, the post-conversion positions and difference values thereof are determined and used to obtain the range of the input block following conversion.

An output block (including $4 \times 6 = 24$ pixels) covering the input block range is then acquired. Appropriate reciprocal difference values are used to find each point in each output block corresponding to the representative point in the original image $IM_1$. The data thus obtained are provided via a data converting hardware circuit 20 to a second dedicated hardware circuit 30 which carries out the image conversion process.

Using the image data obtained through the image transformation process carried out by the microprocessor 17, a shading coefficient generating section 21 generates a shading coefficient representing the degree of reflection of light from a diverging light source incident on a given surface of the transformed image represented by image data positioned relative to the light source. The shading coefficient, used to weight the image data in accordance with such shading, is stored in a memory of the shading coefficient generating section 21.

The embodiment of FIG. 1 receives a luminance signal Y and color difference signals U and V as the components of an input color video signal at respective input terminals of an analog-to-digital (A/D) converter 31 and outputs corresponding digital signals to respective input terminals of a data modifying circuit 32. A spot light source key data generating section 22 produces a spot light key signal $K_O$ which it supplies to a first input of a coefficient unit 23. The manner in which the spot light source key data generating section 22 produces the signal $K_O$ is described below in greater detail. The coefficient unit 23 receives the shading coefficient data from the shading coefficient generating section 21 at a second input and is operative to multiply the spot light source key signal $K_O$ with the shading coefficient data from the shading coefficient generating section 21 to produce an output coefficient. The coefficient unit 23 supplies the output coefficient at an output terminal thereof coupled with a further input of the data modifying circuit 32 which serves to weight the digitized video data corresponding to the output image so that the image data when transformed is appropriately modified to depict the desired shading and illumination.

The data modifying circuit 32 modifies the digitized luminance and color difference signals in accordance with the output coefficient and supplies the modified data to a digital filter 33 which filters the same in accordance with a pass-band controlled in response to an output from the buffer memory 18. For example, where the original image is contracted by the transformation such that minute details thereof are suppressed in the transformed image, the pass-band is narrowed so as to suppress the resulting noise. If the original image is enlarged and contracted in different respective portions, the pass-band of the filter is suitably selected to accommodate each situation.

The filtered signals are output by the digital filter 33 to respective inputs of an input frame memory 34 of an image converting hardware circuit 30. A read/write address control circuit 37 of the image converting hardware circuit 30 receives conversion data from the data converting hardware circuit 20 and, using the received data, controllably addresses the input frame memory 34 for storing the filtered image data therein. The input frame memory 34 includes respective output terminals for providing the three digitized components read therefrom under the control of read addresses supplied by the address control circuit 37 to an interpolating circuit 35. Circuit 35 serves to produce image data for locations between data sampling points represented by data stored in the input frame memory 34 as may be necessary to produce portions of the transformed image signal. The operation of the interpolating circuit 35 is controlled by the address control circuit 37. More particularly, the blocks of image data stored in the input frame memory are read by the address control circuit 37 for processing one at a time starting with the deepest block according to the pointer as described above. The interpolating circuit 35 produces any required interpolated image data for constructing the output transformed image signal which it then writes, together with uninterpolated image data, in an output frame memory 36 also under the control of the address control circuit 37 pursuant to a block addresses provided thereby representing output? image locations.

The output frame memory 36, having received the three-dimensional transformed image data in block units, then proceeds to read the three-dimensional transformed image data consecutively to a digital-to-analog (D/A) converter 39 via a filter 38. The D/A converter 39 serves to produce an analog luminance signal Y and color difference signals U and V from the transformed data supplied thereto. These analog signals are, in turn, supplied to a CRT display (not shown for purposes of simplicity and clarity) to reproduce the transformed image.

Following is a description of the manner in which the shading coefficient is produced pursuant to the embodiment of FIG. 1. The plane surface of a converted output image block (having $4 \times 6 = 24$ pixels) provides a model for producing output blocks starting with the deepest block in accordance with the pointer as described above. A flag is added to the given block for indicating whether the block is on a front surface or a back surface of the transformed image. This information is required where an image conforming to a plane surface is transformed onto a surface such as the cylindrical surface depicted in FIGS. 2(A) through 2(C), since the back surfaces of certain portions of the transformed image thereby become visible to the observer.

Figure 2A:
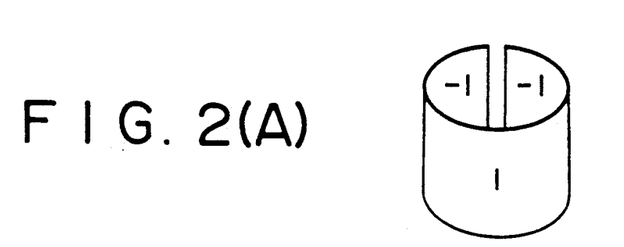
FIGS. 2(A) through 2(C) are respective diagrammatic views of a three-dimensional transformed image for illustrating the manner in which shading is carried out with the use of the embodiment of FIG. 1.
Figure 2B:
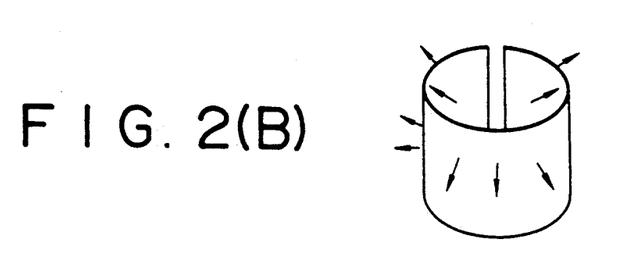
Figure 2C:
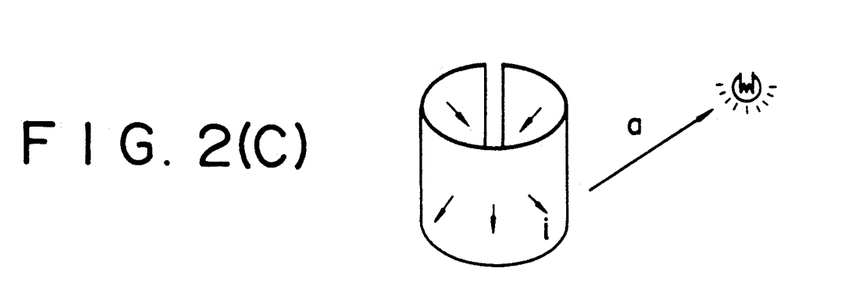

In the embodiment described above, flags are provided which afford the necessary ability to distinguish front and back surfaces in order to produce appropriate shading in the resulting image. For example, a flag "1" is included with a front surface block and a flag "−1" is included with a back surface block,, as illustrated in FIG. 2(A), and a normal vector i for the plane surface of each given block is obtained. Once the normal vector is obtained, a check is made to determine whether the block is a front surface block or a back surface block. If a given block is found to be a front surface block, a normal vector for the front surface is established therefor. If, instead, the given block is found to be a back surface block, the normal vector for the back surface is established therefor. That is, the unit vectors for each block indicating the normal direction of the surface thereof, as shown in FIG. 2(B), are multiplied by the flag. Exemplary resulting vectors are depicted in FIG. 2(C).

With reference also to FIG. 9, for each given block a vector a in the direction of a point light source which is assumed to be at a predetermined position is obtained and the inner product of the vector a and the normal vector i is determined (i·a). From the inner product, the shading coefficient is determined for each given block and is then stored in the memory of the shading coefficient generating section 21.

When each input data sample corresponding with a given output block is provided by the A/D converter 31, the microprocessor 17 reads the respective shading coefficient from the shading coefficient generating section 21. The shading coefficient is multiplied in the coefficient unit 23 by the spot light key signal $K_O$ from the spot light key data generating section 22, as described above. The resulting signal is provided by the coefficient unit 23 to the data modifying circuit 32 in order to modify the luminance level of the luminance signal as well as the hue of the color difference signals in order to provide appropriate shading in the corresponding image.

Figure 3A:
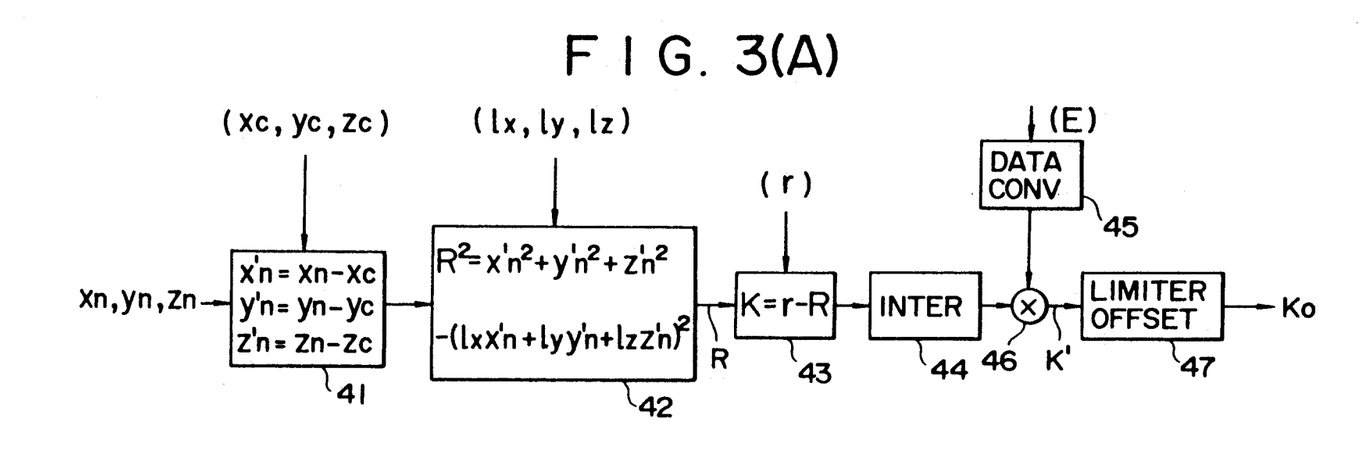
FIG. 3(A) is a block diagram of a spot light source key data generating section of the FIG. 1 embodiment for use in implementing a spot light effect therewith.
Figure 3B:
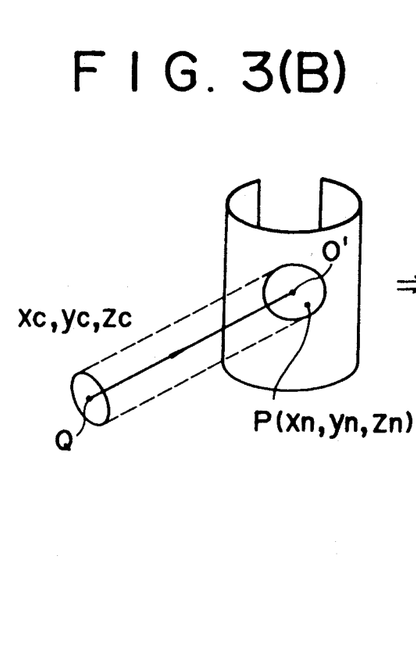
FIGS. 3(B) through 3(D) are diagrams used in explaining the operation of the spot light source key data generating section of FIG. 3(A)

Referring now to FIG. 3(A), a functional block diagram is provided therein for illustrating the process by which the spot light key data generating section 22 generates the spot light key signal for modifying the image data to depict illumination by a light beam from a spot light source. First the respective distances of the converted image data from the center of the spot light are determined. With reference also to FIG. 3(B), a first distance determining processor 41 is provided with coordinate values of a given point or region P ($X_n$, $Y_n$, $Z_n$) in a converted three-dimensional surface image. The processor 41 is also provided with coordinate values (Xc, Yc, Zc) of the central point Q of a spot light source having a radius r which illuminates the three-dimensional surface image, as illustrated in FIG. 3(B), and produces coordinate values $X'_n$, $Y'_n$ and $Z'_n$ as follows:

$$X'_n = X_n - Xc \quad (3)$$

$$Y'_n = Y_n - Yc \quad (4)$$

$$Z'_n = Z_n - Zc \quad (5)$$

The coordinate values ($X'_n, Y'_n, Z'_n$) represent the distance between the center Q of the spot light source and the given point P in three-dimensional terms. These coordinate values are then provided to a second distance determining processor 42 in which they are combined with direction vector component values $1x$, $1y$ and $1z$ of the spot in the three-dimensional coordinate system in accordance with the following relationship:

$$R^2 {X'_n}^2 + {Y'_n}^2 + {Z'_n}^2 - (1xX'_n + 1yY'_n + 1zZ'_n)^2 \quad (6)$$

Figure 3C:
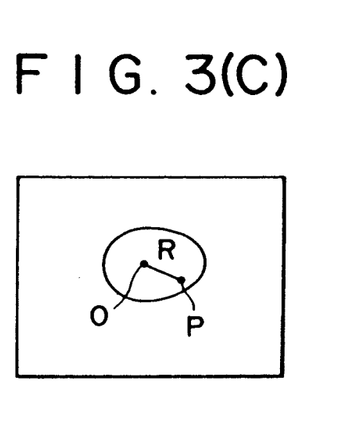

The value R, as illustrated in FIG. 3(C), represents a distance between the given point P ($X_n$, $Y_n$, $Z_n$) in the transformed image and a center O of the light spot projected onto the transformed image.

When, for example, the spot light beam axis extending from the center point Q (Xc, Yc, Zc) of the spot light source intercepts the given point P ($X_n$, $Y_n$, $Z_n$) on the surface of the transformed image, it will be seen that the value R determined in accordance with equation (6) above will be equal to zero due to the coincidence of the point P with the spot light beam axis. If, on the other hand, the point P is spaced some distance from the point of intersection of the spot light beam axis with the surface of the transformed image, it will be seen that the direction of the spot light beam deviates from that of the line joining the point P with the center point Q of the spot light source, as in the case of the point P illustrated in FIG. 3(C). In that event, a non-zero value of R representing the distance from a point O at the intersection of the spot light beam axis with the surface of the transformed image to the point P is provided.

The value R representing the distance of the given point from the center of the spot light beam on the surface of the transformed image is supplied to an edge determining processor 43, along with the value r representing the diameter of the spot light beam irradiated onto the transformed image. The unit 43 produces a key data value K for each given point P of the transformed image corresponding with the difference between the values R and r which indicates a distance of the point P from the edge of the light spot. If, for example, the key data value K is greater than zero, this indicates that the given point P ($X_n$, $Y_n$, $Z_n$) is within the range of the light spot on the transformed image surface. If, however, the key data value K is smaller than zero, the point P is located outside the light spot range.

Figure 3D:
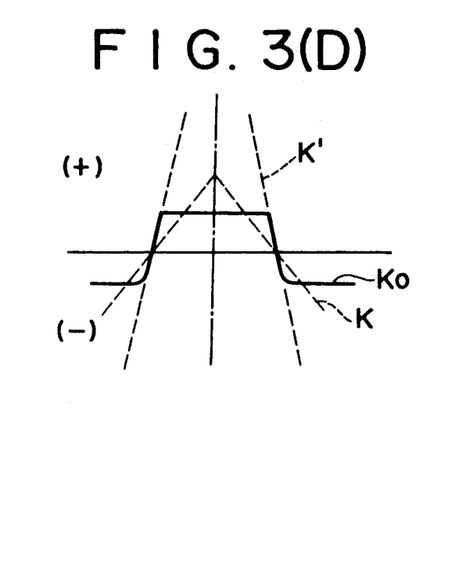

With reference also to FIG. 3(D) the key data values K are plotted therein along a straight line extending in the radial direction of the light spot. The plot of the key data values K provided in FIG. 3(D) indicates that light is reflected strongly from image locations where the light spot value K is greater than zero (that is, "+" values as shown in FIG. 3(D)), and that relatively less light is reflected where K is smaller than zero (that is, "−" values in FIG. 3(D)), thus indicating a darkened condition at the corresponding points of the transformed image. In order to smooth the key data values K which are obtained discretely, a data interpolating processor 44 is provided downstream of the edge calculating processor 43.

When a light spot is projected onto a three-dimensional surface, it is natural for the edge of the spot to display a sharp gradient from light to dark areas. To present the edge of the light spot in this manner, the disclosed embodiment of the invention provides "softness" data E to a data conversion processor 45 which operative to output edge coefficient data which is multiplied with the key data values K, as indicated by the multiplier 46, thus to provide converted key data values K' as illustrated in FIG. 3(D). The converted key data values K' are supplied to a limiter offset processor 47 which limits the converted key data values K' and adds an offset thereto to produce the spot light key data signal $K_O$ having values greater than zero whose relative magnitudes with respect to the radial direction of the light spot are as indicated in FIG. 3(D).

The foregoing operations provide a light spot edge having a fairly sharp gradation, affording a natural appearance of the light spot on a given surface. The light spot key signal $K_O$ output by the limiter offset processor, 47, as indicated in FIG. 1, is supplied to the coefficient unit 23 in which the same is multiplied by the corresponding shading coefficient from the shading coefficient generating section 21. Such multiplication process is carried out so that only the portion of the transformed signal representing the portion of the image illuminated by the spot light is brightened by the output of the coefficient unit 23.

Figure 4A:
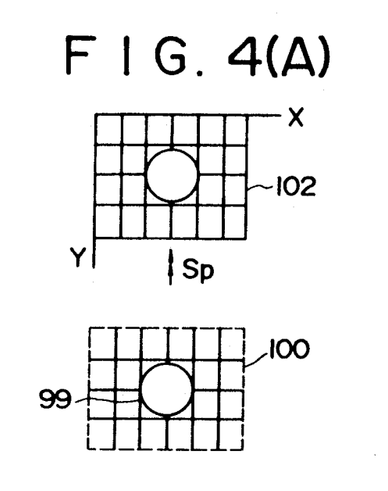
FIGS. 4(A) through 4(F) are schematic representations of two-dimensional images producible by respective input video signals and corresponding transformed three-dimensional images producible by transformed output video signals, for depicting the manner in which a spot light illumination thereof is produced with the use of the embodiment of FIG. 1.
Figure 4B:
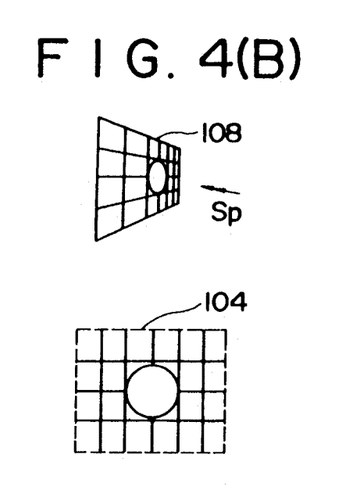
Figure 4C:
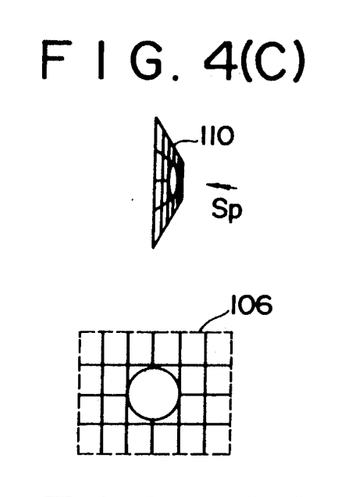

FIGS. 4(A) through 4(F) schematically illustrate the key data defining the light spot edge relative to the input image as well as the resulting light spot after image transformation. In FIGS. 4(A) through 4(F), the arrows Sp indicate the direction of spot light illumination. With reference to FIG. 4(A) the key data defines a light spot 99 on an input two-dimensional image 100, together with a resulting image 102 which has been output without transformation by the embodiment of FIG. 1. FIGS. 4(B) and 4(C) depict transformations in which respective input images 104 and 106 are transformed to produce inclined output images 108 and 110, respectively, to depict perspective views. In the case of the transformed images of FIGS. 4(B) and 4(C), the spot light Sp is directed perpendicularly to the inclined image, and consequently, the positions of the key data generated for the input image signal remain unchanged.

Figure 4D:
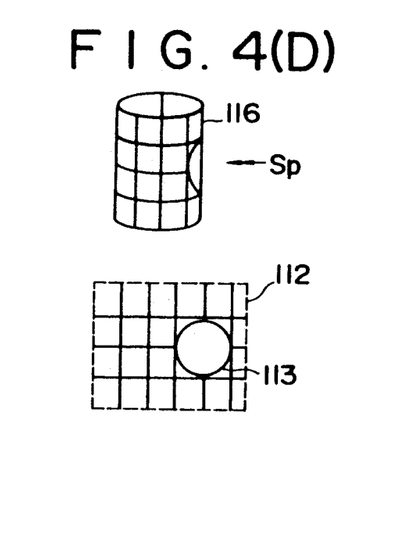
Figure 4E:
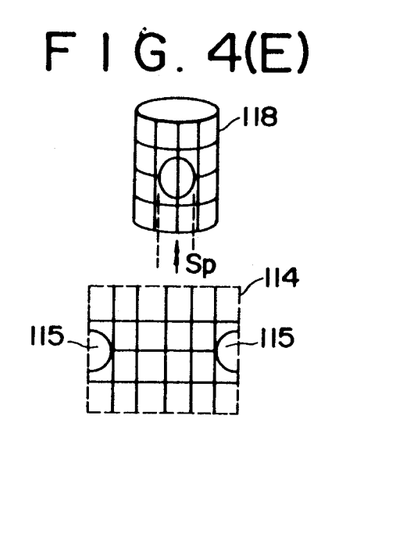
Figure 4F:
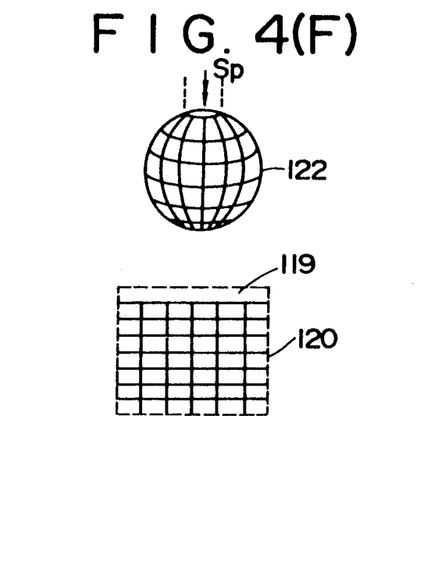

In FIGS. 4(D) and 4(E), respective input images 112 and 114 are transformed into corresponding cylindrical images 116 and 118. Unlike the transformations illustrated in FIGS. 4(A) through 4(C), the positions of the key data generated for the input images 112 and 114 (indicated as 113 and 115, respectively) vary drastically depending on the direction of the spot light source Sp.. FIG. 4(F) illustrates the positioning of the key data 119 on an input image 120 which is transformed onto a spherical surface, such that the light spot source Sp is above the resulting spherical output image 122.

It will be appreciated that the present invention provides the capability, not heretofore realized, to depict localized shading/illumination effects, such as that in which a light spot is projected onto a two-dimensional image mapped in real-time onto a three-dimensional surface. The present invention, therefore, provides the ability to present converted images in more diverse ways thus to enhance the available visual effects. A further benefit afforded by certain advantageous embodiments of the invention is the ability to represent the illumination of three-dimensional images by a light spot source wherein the edge of the light spot is smoothed to provide a natural appearance.

It will appreciated that the image transforming apparatus and method in accordance with the present invention may be implemented in whole or in part using either analog or digital circuitry and all or part of the signal processing functions thereof may be carried out either by hardwired circuits or with the use of a microprocessor, microcomputer or the like.

Although a specific embodiment of the invention has been described in detail herein with reference to the accompanying drawings, it is to be appreciated that the invention is not limited to the disclosed embodiment, and that various changes and modifications may be effected therein by one skilled in the art without departing from the scope or spirit of the invention as defined in the appended claims.

What is claimed is:

1. An image transforming apparatus for transforming an input video signal representing a two-dimensional image into a transformed video signal representing said two-dimensional image transformed onto a three-dimensional surface and for depicting illumination thereof by a spot light source, said input video signal having at least one of a luminance component and hue components, comprising:
   means for defining said three-dimensional surface;
   means for providing a mapping data signal for transforming said input video signal onto said three-dimensional surface;
   means for transforming said input video signal in accordance with said mapping data signal to generate said transformed video signal representing an image conforming with said three dimensional surface, said transformed video signal having at least one of a luminance component and hue components;
   first means for generating a spot light source signal including first and second data signals, the first data signal representing a direction of an axis of a spot light source and the second data signal representing a radius of said spot light source;
   second means for generating a spot light key signal based on said second data signal and a distance signal representing distances between locations on said three-dimensional surface and the axis of said spot light source based on said first data signal and said mapping data signal; and
   means for modifying at least one of said luminance component and said hue components of at least one of said input video signal and said transformed video signal in accordance with said spot light key signal.

2. The image transforming apparatus of claim 1, wherein said second means is operative to generate said spot light key signal based on a comparison of said second data signal and said distance signal.

3. The image transforming apparatus of claim 2, wherein said second means is operative to generate said spot light key signal based on differences between said radius of said spot light source as represented by said second data signal and said distances between locations on said three-dimensional surface and the axis of the spot light source.

4. The image transforming apparatus of claim 1, wherein said modifying means is operative to multiply said at least one of said luminance component and said hue components by a coefficient proportional to said spot light key signal.

5. The image transforming apparatus of claim 4, wherein said second means is operative to generate values of said spot light key signal for a portion of the image represented by said transformed video signal including the axis of said spot light source which uniformly represent a maximum illumination value.

6. The image transforming apparatus of claim 4, wherein said second means is operative to generate values of said spot light key signal for portions of said transformed two-dimensional video image signal adjacent an edge of said spot light source which are proportional to said distance signal multiplied by an edge coefficient selected to increase an illumination gradient represented by said spot light key signal adjacent the edge of said spot light source.

7. The image transforming apparatus of claim 4, further comprising shading coefficient generating means for producing a shading coefficient signal representing shading of the image corresponding with said transformed video signal, and wherein the modifying means is operative to modify said at least one of said luminance component and said hue components in accordance with said shading coefficient signal.

8. The image transforming apparatus of claim 7,, wherein said modifying means is operative to modify said at least one of said luminance component and said hue components based upon a combined illumination signal proportional to a product of said shading coefficient signal and said spot light key signal.

9. A method for transforming an input video signal representing a two-dimensional image into a transformed video signal representing said two-dimensional image transformed onto a three-dimensional surface and for depicting illumination thereof by a spot light source, said input video signal having at least one of a luminance component and hue components, comprising the steps of:
   defining said three-dimensional surface;
   providing a mapping data signal for transforming said input video signal onto said three-dimensional surface;
   transforming said input video signal in accordance with said mapping data signal to generate said transformed video signal representing an image conforming with said three-dimensional surface, said transformed video signal having at least one of a luminance component and hue components;

generating a spot light source signal including first and second data signals, the first data signal representing a direction of an axis of a spot light source and the second data signal representing a radius of said spot light source;

generating a spot light key signal based on said second data signal and a distance signal representing distance between locations on said three-dimensional surface and the axis of the spot light source based on said first data signal and said mapping data signal; and modifying at least one of said luminance component and said hue components of at least one of said input video signal and said transformed video signal in accordance with said spot light key signal.

* * * * *